United States Patent Office 2,978,487
Patented Apr. 4, 1961

2,978,487

N,N'-DINITRO DICARBAMATES

Milton B. Frankel, Pasadena, Calif., assignor to Aerojet-General Corporation, Azusa, Calif., a corporation of Ohio No Drawing. Filed Nov. 5, 1954, Ser. No. 466,969

20 Claims. (Cl. 260—482)

This invention relates to new compositions of matter and a method for their preparation. In particular, it relates to N,N'-dinitro dicarbamates having the general formula:

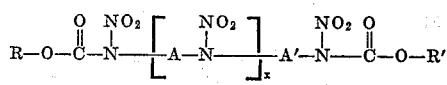

wherein R and R' are nitroalkyl radicals, A and A' are radicals selected from the group consisting of alkylene and nitroalkylene radicals, and $x$ is a small whole number from 0 to 5 inclusive.

The compounds of this invention are prepared by reacting nitrocarbamates with nitric acid, in accordance with the general reaction scheme set forth below:

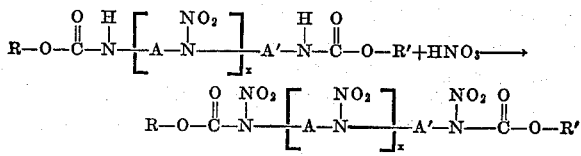

wherein R, R', A, A', and $x$ are as defined above.

The reaction is preferably conducted at a temperature in the range of from about 0° to about 15° C. The reaction can be performed at higher temperatures, however, it is preferred to run the reaction at reduced temperatures to permit better control of the reaction rate. Increased smoothness and control of the nitration is achieved when the reaction is conducted in the presence of an alkanoic anhydride.

The dicarbamates used as starting materials are prepared by the addition of nitro alcohols to diisocyanates, as disclosed in my copending application No. 464,610, filed October 25, 1954.

To more clearly illustrate my invention, the following examples are presented. It should be understood, however, that these examples are presented merely as a means of illustration and are not intended to limit the scope of the invention in any way.

EXAMPLE I

*Preparation of N,N'-dinitro-methylene-bis(2,2,2-trinitroethyl dicarbamate)*

15 ml. of 100% nitric acid was placed in a 100 ml. 3-necked flask, fitted with a mechanical stirrer, thermometer, and addition funnel. The flask was cooled in an ice bath and 15 ml. of acetic anhydride was added dropwise, followed by one gm. of methylene bis-(trinitroethyl dicarbamate). The solution was stirred for 15 minutes, permitted to warm to room temperature, heated at 40–45° C. for five minutes, cooled, and poured onto ice. An oil was formed which crystallized to a white solid. The solid was collected, washed with water, and dried in vacuo. The yield of methylene N,N'-dinitro-bis(trinitroethyl dicarbamate) was 1.2 gm., M.P. 92–93° C. Three recrystallizations from chloroform gave white needles, M.P. 95–96° C., which resolidified at 102° C. and melted at 112–113° C., impact stability=25–30 cm./2 kg. The elemental analysis of the product is as follows:

Calculated for $C_7H_6N_{10}O_{20}$: percent C, 15.28; percent H, 1.10; percent N, 25.46. Found: percent C, 15.53; percent H, 1.26; percent N, 24.96.

Calculated heat of combustion: 1251 cal./gm. Found: 1258 cal./gm.

Calculated lead block value: 170 TNT=100.
Calculated ballistic mortar value: 134 TNT=100.

EXAMPLE II

*Preparation of N,N'-dinitro-3,3-dinitro-1,5-pentane-bis(2,2,2-trinitroethyl dicarbamate)*

A nitration mixture of 50 ml. of 100% nitric acid and 50 ml. of acetic anhydride was cooled in an ice bath and 5.0 gm. of 3,3-dinitro-1,5-pentane-bis(trinitroethyl dicarbamate) was added. The reaction mixture was stirred for 20 minutes and poured onto ice. The white solid was collected, washed with water, and dried to give 4.9 gm. of product, M.P. 148–150° C. Two recrystallizations from methylene chloride raised the melting point to 151–152° C., impact stability=25–30 cm./2 kg. The elemental analysis of the product is as follows:

Calculated for $C_{11}H_{12}N_{12}O_{24}$: percent C, 18.97; percent H, 1.74; percent N, 24.14. Found: percent C, 19.19; percent H, 1.77; percent N, 23.87.

Calculated heat of combustion: 1784 cal./gm. Found: 1776 cal./gm.

Calculated lead block value: 165 TNT=100.
Calculated ballistic mortar value: 140 TNT=100.

EXAMPLE III

*Preparation of N,N'-dinitro-3-nitraza-1,5-pentane bis(2,2,2-trinitroethyl dicarbamate)*

Ten ml. of 100% nitric acid was cooled to 0° C. and 10 ml. of acetic anhydride was added dropwise. To the solution was added 0.5 gm. of 3-nitraza-1,5-pentane-bis-(2,2,2-trinitroethyl dicarbamate). While maintaining the temperature at about 5–10° C., the solution was stirred for 20 minutes. The solution was then poured over ice. The resulting white solid was recrystallized from ethylene dichloride in 86.3% yield, M.P. 120–122° C. The elemental analysis of the product is as follows:

Calculated for $C_{10}H_{12}N_{12}O_{22}$: percent C, 18.41; percent H, 1.86; percent N, 25.77. Found: percent C, 18.98; percent H, 2.23; percent N, 25.87.

Calculated heat of combustion: 1792 cal./gm. Found: 1826 cal./gm.

Calculated lead block value: 162 TNT=100.
Calculated ballistic mortar value: 140 TNT=100.

EXAMPLE IV

*Preparation of N,N'-dinitro-3,3,5,7,7-pentanitro-5-aza-1,9-nonane-bis(2,2,2-trinitroethyl dicarbamate)*

Ten ml. of 100% nitric acid was cooled to 0° C. and 10 ml. of acetic anhydride was added dropwise. To the solution was added 0.5 gm. of 3,3,5,7,7-pentanitro-5-aza-1,9-nonane-bis(2,2,2-trinitroethyl dicarbamate). While maintaining the temperature at about 5–10° C., the solution was stirred for 20 minutes. The solution was then poured over ice. The resulting white solid was recrystallized from ethylene dichloride in 93.3% yield, M.P. 150–151° C. The elemental analysis of the product is as follows:

Calculated for $C_{14}H_{16}N_{16}O_{30}$: percent C, 18.93; percent H, 1.82; percent N, 25.23. Found: percent C, 19.12; percent H, 1.84; percent N, 25.19.

Calculated heat of combustion: 1857 cal./gm. Found: 1946 cal./gm.
Calculated lead block value: 164 TNT=100.
Calculated ballistic mortar value: 142 TNT=100.

EXAMPLE V

Preparation of N,N'-dinitro-3,6-nitraza-1,8-octane-bis-(2,2,2-trinitroethyl dicarbamate)

Ten ml. of 100% nitric acid was cooled to 0° C. and 10 ml. of acetic anhydride was added dropwise. To the solution was added 0.5 gm. of 3,6-nitraza-1,8-octane-bis(2,2,2-trinitroethyl dicarbamate). While maintaining the temperature at about 5-10° C., the solution was stirred for 20 minutes. The solution was then poured over ice. The resulting white solid was recrystallized from 70% nitric acid in 87.8% yield, M.P. 127-128° C. The elemental analysis of the product is as follows:

Calculated for $C_{12}H_{16}N_{14}O_{24}$: percent C, 19.47; percent H, 2.18; percent N, 26.49. Found: percent C, 19.51; percent H, 2.29; percent N, 25.78.
Calculated lead block value: 142 TNT=100.
Calculated ballistic mortar value: 141 TNT=100.

EXAMPLE VI

Preparation of N,N'-dinitro-2-nitraza-1,4-butane-bis-(2,2,2-trinitroethyl dicarbamate)

In a one-liter three-necked flask, fitted with a mechanical stirrer, thermometer, and dropping funnel, was placed 200 ml. of technical 100% nitric acid. The flask was cooled in an ice-salt bath, and 200 ml. of acetic anhydride was added dropwise, keeping the temperature below 10° C. 25.0 gm. quantity of 2-nitraza-1,4-butane-bis-(2,2,2-trinitroethyl dicarbamate) was added portionwise. The solution was stirred at 5-10° C. for 15 minutes and poured on ice. The white gummy solid was collected and dried in vacuo over potassium hydroxide; the weight was 18.3 gm. (62.8%). Several recrystallizations from ethylene dichloride gave white needles, M.P. 113-114° C. The elemental analysis of the product is as follows:

Calculated for $C_9H_{10}N_{12}O_{22}$: percent C, 16.94; percent H, 1.58; percent N, 26.34. Found: percent C, 16.98; percent H, 1.59; percent N, 25.61.

By proceeding in accordance with the examples set forth above, I have also found that dicarbamates such as methylene-bis(3,3-dinitropropyl dicarbamate), 3,5,5-trinitro-3-aza-1,8-octane-bis-(2,2,2-trinitroethyl dicarbamate), and 3,3-dinitro-1,5-pentane-bis(3,3,3-trinitropropyl

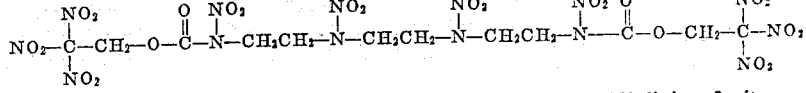

dicarbamate) will react with nitric acid to produce N,N'-dinitromethylene-bis(2,2-dinitropropyl dicarbamate), N,-N'-dinitro-3,5,5-trinitro-3-aza-1,8-octane-bis(2,2,2 - trinitroethyl dicarbamate), and N,N'-dinitro-3,3-dinitro-1,5-pentane-bis-(3,3,3-trinitropropyl dicarbamate), respectively.

It is apparent from the above discussion that any member of the N,N'-dinitro dicarbamate series may be prepared by merely selecting the appropriate dicarbamate and reacting it with nitric acid, in accordance with the teachings of this invention.

The nitro compounds of this invention are useful as high explosives and can be used in any conventional high explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:

1. As compositions of matter, N,N'-dinitro dicarbamates having the general formula:

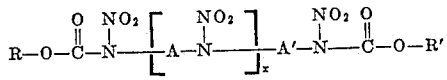

wherein R and R' are lower nitroalkyl radicals, A and A' are radicals selected from the group consisting of lower alkylene and lower nitroalkylene radicals, and $x$ is a small whole number of 0 to 5 inclusive.

2. As a composition of matter, N,N'-dinitromethylene-bis(2,2,2-trinitroethyl dicarbamate) having the structural formula:

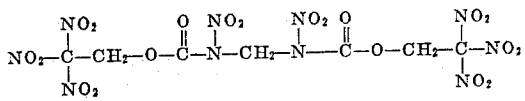

3. As a composition of matter, N,N'-dinitro-3,3-dinitro-1,5-pentane-bis(2,2,2-trinitroethyl dicarbamate) having the structural formula:

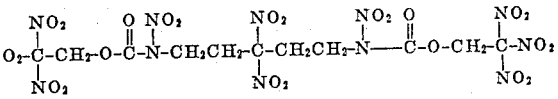

4. As a composition of matter, N,N'-dinitro-3-nitraza-1,5-pentane-bis(2,2,2-trinitroethyl dicarbamate) having the structural formula:

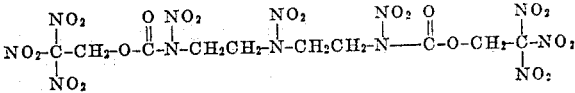

5. As a composition of matter, N,N'-dinitro-3,3,5,7,7-pentanitro-5-aza-1,9-nonane-bis(2,2,2-trinitroethyl dicarbamate) having the structural formula:

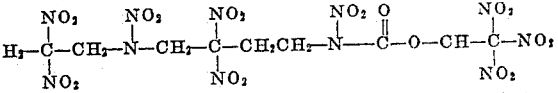

6. As a composition of matter, N,N'-dinitro-3,6-nitraza-1,8-octane-bis(2,2,2-trinitroethyl dicarbamate) having the structural formula:

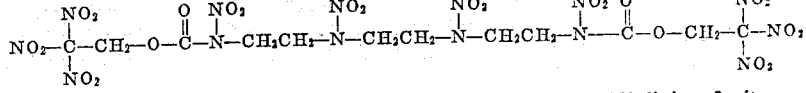

7. As a composition of matter, N,N'-dinitro-2-nitraza-1,4 - butane - bis(2,2,2 - trinitroethyl dicarbamate) having the structural formula:

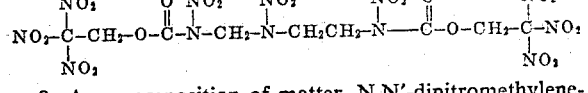

8. As a composition of matter, N,N'-dinitromethylene-bis(2,2-dinitropropyl dicarbamate) having the structural formula:

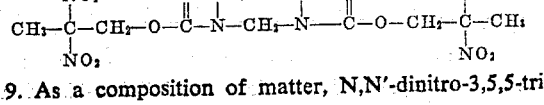

9. As a composition of matter, N,N'-dinitro-3,5,5-trinitro-3-aza-1,8-octane-bis(2,2,2-trinitroethyl dicarbamate) having the structural formula:

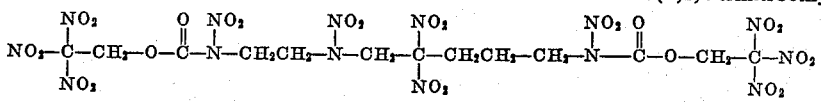 

10. As a composition of matter, N,N'-dinitro-3,3-dinitro-1,5-pentane-bis(3,3,3-trinitropropyl dicarbamate) having the structural formula:

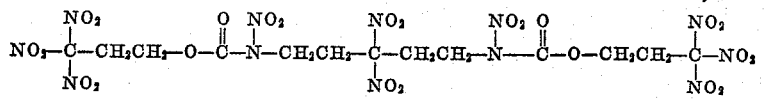 

11. The method of preparing N,N'-dinitro dicarbamates having the general formula:

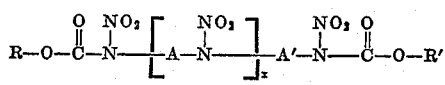

which comprises reacting nitric acid with a carbamate having the general formula:

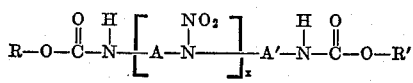

wherein R and R' are lower nitroalkyl radicals, A and A' are radicals selected from the group consisting of lower alkylene and lower nitroalkylene radicals, and $x$ is a small whole number from 0 to 5 inclusive.

12. The method of preparing N,N'-dinitromethylene-bis(2,2,2-trinitroethyl dicarbamate) which comprises reacting nitric acid with methylene-bis(2,2,2-trinitroethyl dicarbamate).

13. The method of preparing N,N'-dinitro-3,3-dinitro-1,5-pentane-bis(2,2,2-trinitroethyl dicarbamate) which comprises reacting nitric acid with 3,3-dinitro-1,5-pentane-bis(2,2,2-trinitroethyl dicarbamate).

14. The method of preparing N,N'-dinitro-3-nitraza-1,5-pentane-bis(2,2,2-trinitroethyl dicarbamate) which comprises reacting nitric acid with 3-nitraza-1,5-pentane-bis(2,2,2-trinitroethyl dicarbamate).

15. The method of preparing N,N'-dinitro-3,3,5,7,7-pentanitro-5-aza-1,9-nonane-bis(2,2,2,-trinitroethyl dicarbamate) which comprises reacting nitric acid with 3,3,5,7,7,-pentanitro-5-aza-1,9-nonane-bis(2,2,2 - trinitroethyl dicarbamate).

16. The method of preparing N,N'-dinitro-3,6-nitraza-1,8 - octane-bis(2,2,2-trinitroethyl dicarbamate) which comprises reacting nitric acid with 3,6-nitraza-1,8-octane-bis(2,2,2-trinitroethyl dicarbamate).

17. The method of preparing N,N'-dinitro-2-nitraza-1,4-butane-bis(2,2,2-trinitroethyl dicarbamate) which comprises reacting nitric acid with 2-nitraza-1,4-butane-bis(2,2,2-trinitroethyl dicarbamate).

18. The method of preparing N,N'-dinitromethylene-bis(2,2-dinitropropyl dicarbamate) which comprises reacting nitric acid with methylene-bis(2,2-dinitropropyl dicarbamate).

19. The method of preparing N,N'-dinitro-3,5,5-trinitro - 3 - aza - 1,8 - octane-bis(2,2,2 - trinitroethyl dicarbamate) which comprises reacting nitric acid with 3,5,5-trinitro - 3 - aza - 1,8-octane-bis(2,2,2-trinitroethyl dicarbamate).

20. The method of preparing N,N'-dinitro-3,3-dinitro-1,5-pentane-bis(3,3,3-trinitropropyl dicarbamate) which comprises reacting nitric acid with 3,3-dinitro-1,5-pentane-bis(3,3,3-trinitropropyl dicarbamate).

References Cited in the file of this patent

FOREIGN PATENTS 138,456    Sweden _____ Dec. 23, 1952